United States Patent [19]

Inamori

[11] Patent Number: 5,715,000
[45] Date of Patent: Feb. 3, 1998

[54] NOISE REDUCTION CIRCUIT FOR REDUCING NOISE CONTAINED IN VIDEO SIGNAL

[75] Inventor: Shinri Inamori, Yokohama, Japan

[73] Assignee: Texas Instruments Incorporated, Dallas, Tex.

[21] Appl. No.: 516,260

[22] Filed: Aug. 17, 1995

Related U.S. Application Data

[63] Continuation of Ser. No. 126,277, Sep. 24, 1993.

[30] Foreign Application Priority Data

Sep. 24, 1992 [JP] Japan ............... 4-279437

[51] Int. Cl.$^6$ ............... H04N 5/217; H04N 5/21; H04N 5/213
[52] U.S. Cl. ............... 348/241; 348/533; 348/607; 348/620
[58] Field of Search ............... 348/241, 242, 348/252, 525, 533, 606, 607, 620, 625, 627, 683; H04N 5/217

[56] References Cited

U.S. PATENT DOCUMENTS

| | | | |
|---|---|---|---|
| 4,485,403 | 11/1984 | Illetschko | 358/167 |
| 4,500,911 | 2/1985 | Ninomiya | 348/620 |
| 4,636,863 | 1/1987 | Kaizaki et al. | 358/167 |
| 4,951,137 | 8/1990 | Kisou | 358/125 |
| 5,025,316 | 6/1991 | Darby | 348/620 |
| 5,140,424 | 8/1992 | Yoshimura et al. | 358/167 |
| 5,161,018 | 11/1992 | Matsunaga | 358/167 |
| 5,185,664 | 2/1993 | Darby | 348/620 |
| 5,218,649 | 6/1993 | Kundu | 348/625 |
| 5,278,638 | 1/1994 | Nakada et al. | 358/36 |
| 5,404,178 | 4/1995 | Kondo et al. | 348/618 |

*Primary Examiner*—Andrew Faile
*Assistant Examiner*—Ngoc-Yen Vu
*Attorney, Agent, or Firm*—Richard L. Donaldson; William B. Kempler

[57] ABSTRACT

A noise reduction circuit for use with video signals or image producing signals in which trailing and other image degrading phenomena are prevented by not using the noise reduction circuit for the edge of the motion picture portion on the image. The noise reduction circuit includes a subtractor 14 which outputs a difference signal E between input video signal VSi and delayed video signal VSd. ROM 18, a look-up table that forms the coefficient multiplier, outputs a corrected difference signal KE corresponding to the difference signal E from subtractor 14. At adder 12, corrected difference signal KE from ROM 18 is added to input video signal VSi, forming output video signal VSo processed by the noise reduction processing. However, when "H" level expansion video signal MEH,Y is output from vertical expansion circuit 42, the outputs of AND gates 24, 26 become null, and the output signal of ROM 18 becomes null.

9 Claims, 3 Drawing Sheets

NOISE REDUCTION CIRCUIT FOR REDUCING NOISE CONTAINED IN VIDEO SIGNAL

This application is a Continuation of application Ser. No. 08/126,277, filed Sep. 24, 1993.

This invention concerns a type of noise reduction circuit for reducing the noise contained in the video signals.

BACKGROUND OF THE INVENTION

Figure 9:
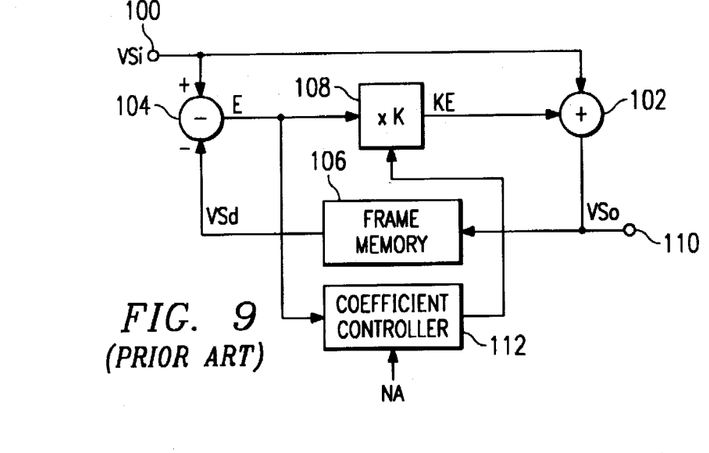
FIG. 9 is a block diagram illustrating the configuration of a conventional noise reduction circuit.

FIG. 9 shows the configuration of a conventional noise reduction circuit used in the digital TV receiver, etc. As an example, the TV signal processed by demodulation and analog/digital (A/D) conversion is input as video signal VSi on input terminal 100. While said input video signal VSi is applied on an input terminal of adder 102, it is applied also on an input terminal of subtractor 104. The other input terminal of subtractor 104 receives delayed video signal VSd, that is, the video signal of one previous picture (1 previous frame for NTSC format) from frame memory 106. Subtractor 104 subtracts delayed video signal VSd from input video signal VSi to derive the difference. Difference E output from subtractor 104 is input to coefficient multiplier 108, where it is multiplied by constant K. Corrected difference KE output from coefficient multiplier 108 is input to the other terminal of adder 102. Adder 102 adds corrected difference KE to input video signal VSi. The output signal of adder 102 is output as output video signal VSo from output terminal 110, and it is input to frame memory 106.

In the aforementioned noise reduction circuit, for adder 102, the following formula stands:

$$VS_o = VS_i + KE \quad (1)$$

For subtractor 104, the following formula stands:

$$E = VS_i - Z^{-1} \cdot VS_o \quad (2)$$

where, $Z^{-1}$ is the delay time of frame memory 106, and it is $\frac{1}{30}$ sec in the NTSC format.

From above formulas 1, and 2, the input/output characteristics, or transmission junction, between input video signal VSi and output video signal VSo can be derived as follows:

$$VS_o/VS_i = (1+K)/(1-KZ^{-1}) \quad (3)$$

Multiplication coefficient K for coefficient multiplier 108 is not a constant. Instead, it can be varied by means of coefficient controller 112. This coefficient controller 112 can change the multiplication coefficient corresponding to difference E derived by subtractor 104 and noise detection value NA in input video signal VSi derived by a noise detector (not shown in the figure). Usually, the larger the noise contained in input video signal VSi, the larger the value of K, and the stronger the noise reduction effect by the control.

However, when the image contains a motion picture portion, at the edge of the motion picture portion (the silhouette), since there is a large change between the present pixels and the pixels of one previous, picture a difference value E between input video signal VSi and delayed video signal VSd becomes large. In this case, if the difference E is higher than the prescribed upper limit, a limiter annexed to coefficient controller 112 functions, multiplication coefficient K is set to null, and corrected difference KE is virtually not applied on adder 102, and input video signal VSi is directly sent out as output video signal VSo in this control scheme.

Figure 10:
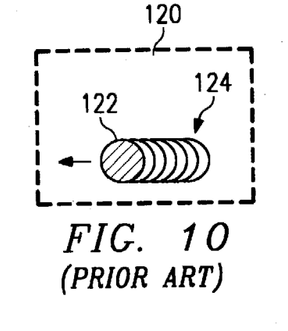
FIG. 10 illustrates the trailing phenomenon of the motion picture.

However, when the difference between the background and the motion picture portion is small, the change in the pixels near the edge of the motion picture is relatively small, and a difference E with a relatively small value is obtained from subtracter 104. As pointed out in the above, in the conventional noise reduction circuit, if this difference E is smaller than the upper limit, the edge of the motion picture portion is not recognized and it is taken as a noise. The multiplication coefficient K ($\neq 0$) is determined corresponding to this difference E; corrected difference KE is sent from coefficient multiplier 108 to adder 102 for the noise reduction processing. As a result, on the reproduced image, due to the noise reduction processing, the image portion corresponding to the preceding image becomes overlapped, leading to blurring over time for the vicinity of the edge of the motion picture. As shown in FIG. 10, for example, when ball 122 on image 120 moves in the direction indicated by the arrow, a trailing phenomenon 124 with a tail appears as the residual image in the direction opposite the moving direction of ball 122 (the rearward direction). This is a problem.

OBJECT OF THE INVENTION

It is an object of this invention to provide a type of noise reduction circuit wherein the noise reduction processing is not performed for the edge of the motion picture portion, and trailing or other image quality degradation can be prevented.

SUMMARY OF THE INVENTION

In accordance with this invention, a noise reduction circuit is provided which comprises a delay means which delays the output video signal by one picture unit, a difference generating means which derives the difference between the input video signal and the delayed video signal output from the aforementioned delay means, a noise reduction processing means which performs the noise reduction processing for the aforementioned input video signal on the base of the difference generated by the aforementioned difference generating means, a motion picture edge detection means which detects the edge of the motion picture portion in each image based on the aforementioned input video signal, and a noise reduction processing inhibiting means which inhibits the aforementioned noise reduction processing for the edge of the motion picture portion detected by the aforementioned motion picture edge detection means and which outputs the aforementioned input video signal directly as the aforementioned output video signal.

When the edge of the motion picture portion is detected by the motion picture edge detection means, the noise reduction processing is inhibited by the noise reduction processing inhibiting means. Consequently, the input video signal is directly output as the output video signal from the output terminal without the noise reduction processing, while it is sent to the delay means. For the portions other than the edge of the motion picture, the noise reduction processing is carried out for the input video signal.

In reference numerals as shown in the drawings:
12, adder
14, subtractor
16, frame memory
18, ROM
22, noise level detection circuit
24, 26, AND gate
30, edge detection circuit
32, comparator
34, threshold value generating circuit
36, frame memory
38, exclusive OR gate
40, horizontal expansion circuit
42, vertical expansion circuit
56, interframe interpolation unit
70, through transmission line
72, switching circuit

DESCRIPTION OF THE PREFERRED EMBODIMENTS

In the following, this invention will be explained in more detail with reference to embodiments as illustrated by FIGS. 1-8.

Figure 1:
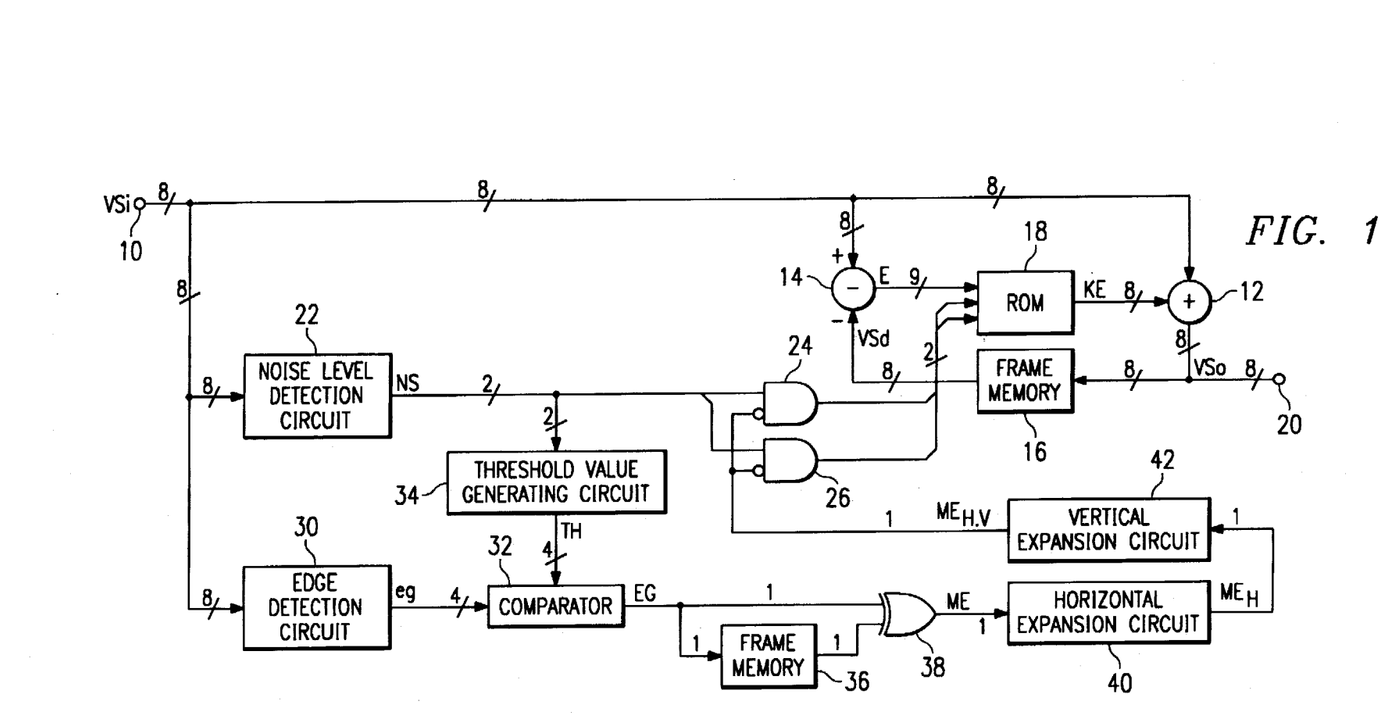
FIG. 1 is a block diagram illustrating the circuit configuration of the noise reduction circuit in an embodiment of this invention.

FIG. 1 shows the configuration of the noise reduction circuit in an embodiment of this invention. Input to input terminal 10 is the 8-bit digital TV signal of the NTSC format after demodulation and analog/digital (A/D) conversion as input video signal VSi. Said input video signal VSi is sent to one of the input terminals of adder 12 and one of the input terminals of subtractor 14, and it is also sent to the input terminal of edge detection circuit 30 of noise level detector 22.

The other input terminal of subtractor 14 receives 8-bit delayed video signal VSd, the video signal of one previous frame as delayed by frame memory 16. At subtractor 14, delayed video signal VSd is subtracted from input video signal VSi, forming an output of 9-bit difference E. Difference E output from subtractor 14 is input to ROM 18. ROM 18 is a look-up table that forms the coefficient multiplier. Difference E from subtractor 14 is input as address, and from the address assigned, 8-bit corrected difference KE corresponding to said difference E is read. Corrected difference KE output from ROM 18 is input to the other input terminal of adder 12. Adder 12 adds corrected difference KE to input video signal VSi. The input signal of adder 12 is output as 8-bit input video signal VSo from output terminal 20 to the circuit in the later stage (not shown in the figure), and it is also sent to frame memory 16.

When the delay time is $Z^{-1}$ at frame memory 16, above formulas (1), (2), (3) also represent for this noise reduction circuit. Coefficient K multiplied by difference E by means of ROM (18) is not constant. Instead, it can be varied under control corresponding to each difference E and the magnitude of the noise contained in input video signal VSi. The magnitude of the noise contained in input video signal VSi is detected by noise level detection circuit 22. At noise level detection circuit 22, the noise is isolated from the clamp level of input video signal VSi by means of a high-pass filter; the isolated noise is integrated by an integrator circuit; and the magnitude of the noise is determined from the value of integration. A 2-bit noise level detection signal NS, which represents which of the four preset steps of the noise component corresponds to the noise level. This noise level detection signal NS is then input to the most significant 2 bits of the address input terminals of ROM 18 through AND gates 24, and 26.

Figure 2:
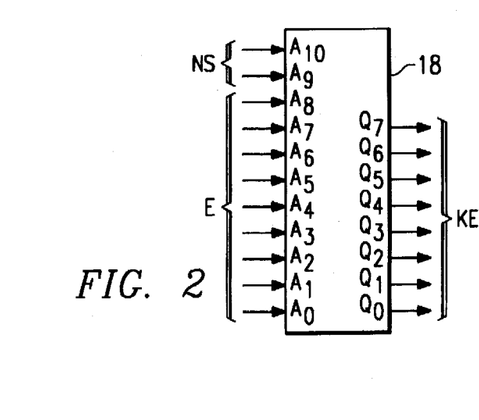
FIG. 2 is a diagram illustrating the bit format of the input/output terminals of the ROM that forms the coefficient multiplier in embodiment of FIG. 1.

FIG. 2 shows the input/output terminals of ROM 18. The 2 most significant bits, A9 and A10, among address input terminals A0–A10 receive 2-bit noise level detection signal NS from noise level detection circuit 22, while the 9 less significant bits, A0–A8, receive 9-bit difference E from subtractor 14. From 8-bit output terminals Q0–Q7, 8-bit corrected difference KE is output.

Figure 3:
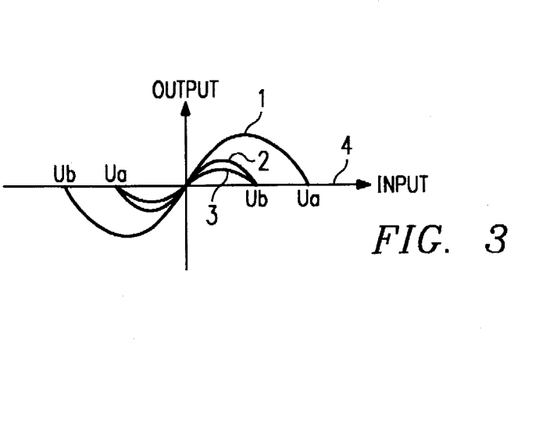
FIG. 3 shows the input/output characteristics of the ROM that forms the coefficient multiplier in the embodiment of FIG. 1.

FIG. 3 shows the input/output characteristics of ROM 18. As can be seen from the figure, four nonlinear input/output characteristics sets (1)–(4) are programmed. Corresponding to the magnitude of the noise contained in input video signal VSi, that is, corresponding to the value of 2-bit noise level detection signal NS input to the most significant two bits A9 and A10 of the input terminals, one set is selected from the four input/output characteristics sets (1)–(4).

When the noise in input video signal VSi becomes the highest of the four levels, noise level detection signal NS takes a value of 3, and input/output characteristics set 1 in ROM 18 is selected. Among the four input/output characteristics sets (1)–(4), this input/output characteristics set (1) has the strongest noise reduction effect. Consequently, for each input value (difference E), the largest output value (corrected difference KE) is set.

When the noise in input video signal VSi becomes the second highest of the four levels, noise level detection signal NS takes a value of 2, and input/output characteristics set 2 in ROM 18 is selected. Input/output characteristics set (2) has the second strongest noise reduction effect. Consequently, for each input value (difference E), the second largest output value (corrected difference KE) is set.

When the noise in input video signal VSi becomes the third highest, noise level detection signal NS takes a value of 1, and input/output characteristics set (3) in ROM 18 is selected. Input/output characteristics set (3) has the third noise reduction effect. Consequently, for each input value (difference E), the third output value (corrected difference KE) is set.

When the noise in input video signal VSi becomes the lowest of the four levels, noise level detection signal NS takes a value of 0, and input/output characteristics set (4) in ROM (18) is selected. Input/output characteristics set (4) has no noise reduction effect. Consequently, for each input value (difference E), the output value (corrected difference KE) is set to null.

In addition, for input/output characteristics sets (1), (2), and (3), when the input value (difference E) exceeds upper limits values Ua and Ub, the output value (corrected difference KE) is set to null. This is the so-called limiter function, in which when the difference E (the difference between input video signal VSi and delayed video signal VSd) exceeds upper limits Ua and Ub, it is taken as a motion picture portion, and the output value (corrected difference KE) is set to null, and input video signal VSi is directly taken as output video signal VSo. However, as has been explained in the background section for the practical motion picture portion, difference E may become lower than upper limits Ua and Ub. In this case, input/output characteristics set (1) is selected for the noise, a strong noise reduction processing is carried out, and trailing takes place. In this embodiment, this trailing and the degradation in the image quality caused by it are avoided by introducing a noise reduction processing inhibitor to be explained in the following, which can reliably inhibit the noise reduction processing for the edge and its vicinity of the virtual motion picture portion.

As shown in FIG. 1, the noise reduction processing inhibitor used in this embodiment consists of edge detection circuit 30, comparator 32, threshold generating circuit 34, frame memory 36, exclusive OR gate 38, horizontal expansion circuit 40, vertical expansion circuit 42 and said AND gates 24 and 26.

For both the still picture portion (still picture region) and the motion picture portion (moving image region), edge detection circuit 30 takes the difference between the adjacent pixels in both the horizontal and vertical directions, respectively. These horizontal and vertical differences are synthesized to form 4-bit pseudo edge detection signal eg for output. Pseudo edge detection signal eg output from edge detection circuit 30 is sent to one of the input terminals of comparator 32. The other input terminal of comparator 32 receives 4-bit threshold value TH corresponding to the value of noise level detection signal NS (noise level) formed by means of threshold generating circuit 34. Comparator 32 compares pseudo edge detection signal eg with threshold value TH. If eg is smaller than TH, an "L" level output signal is generated; if eg is larger than TH, an "H" level output signal is generated as 1-bit real edge detection signal EG. In this way, the larger the noise contained in input video signal VSi, the higher the edge detection threshold value TH.

The output signal of comparator 32 is sent to one input terminal of exclusive OR gate 38, and it is also sent to frame memory 36. The other input terminal of exclusive OR gate 38 receives the output signal of the comparator delayed by one frame by means of frame memory 36. An "H" level output signal is obtained at the output terminal of exclusive OR gate 38 when either the output signal of comparator 32 or the output signal from frame memory 36 is a real edge detection signal EG, that is, when there is a variation over time for the edge portion between the default image and the preceding image, namely, the edge is taken as that of a motion picture. In this way, frame memory 36 and exclusive OR gate 38 make virtual identification of the motion picture portion.

The "H" level output signal from exclusive OR gate 38 passes in order through horizontal expansion circuit 40 and vertical expansion circuit 42 as motion picture edge signal ME. As a result, expansion motion picture edge signals MEH,V are obtained from output terminal of vertical expansion circuit 42 corresponding not only to the vicinity of the edge of the motion picture portion, that is, the edge in the strict meaning, but also to the vicinity in the horizontal direction and vertical direction.

Figure 4:
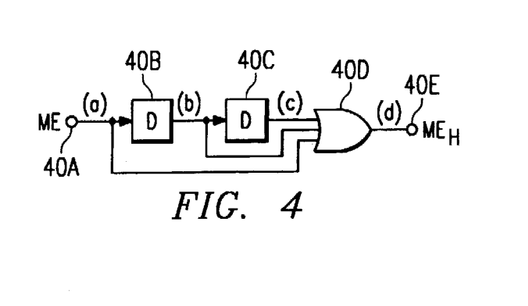
FIG. 4 is a circuit diagram illustrating the configuration of the horizontal expansion circuit contained in the noise reduction circuit in the embodiment of FIG. 1.
Figure 5:
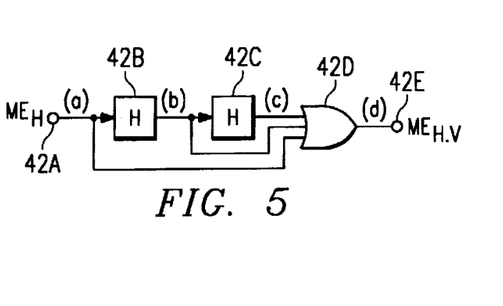
FIG. 5 is a circuit diagram illustrating the configuration of the vertical expansion circuit contained in the noise reduction circuit in the embodiment of FIG. 1.
Figure 6:
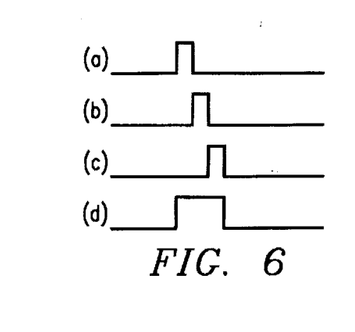
FIG. 6 shows the waveforms at the various portions of the horizontal expansion circuit and vertical expansion circuit in FIGS. 4 and 5, respectively.

FIGS. 4 and 5 illustrate the circuit configurations for horizontal expansion circuit 40 and vertical expansion circuit 42, respectively. In horizontal expansion circuit 40, two delay circuits (40B and (40C, each of which provides a delay time D of one pixel block, are connected in series; output terminals of said two delay circuits (40B, and (40C and input terminal (40A are connected to the input terminals of 3-input OR gate (40D, respectively; and the output terminal of 3-input OR gate (40D is connected to circuit output terminal (40E. In vertical expansion circuit 42, two delay circuits (42B and (42C, each of which provides a delay time (H) of one horizontal scanning period, are connected in series; output terminals of said two delay circuits (42B, (42C and input terminal (42A are connected to the input terminals of 3-input OR gate (42D, respectively; and the output terminal of 3-input OR gate (42D is connected to circuit output terminal (42E. FIG. 6 shows the waveforms of the signals at the various portions in horizontal expansion circuit 40 and vertical expansion circuit 42. In this way, for motion picture portion edge signal ME ("H") from exclusive OR gate 38, the pulse width is first expanded in the horizontal line direction by horizontal expansion circuit 40, and then the pulse width is expanded in the vertical line direction by vertical expansion circuit 42.

The output terminal of vertical expansion circuit 42 is connected to the other (reciprocal) input terminals of AND gates 24, and 26, respectively. The input terminals on the nonreciprocal side of AND gates 24 and 26 are connected to 2-bit output terminal of noise level detection circuit 22. When the output signal of horizontal expansion circuit 42 becomes level "L," the output signals of AND gates 24 and 26 correspond to the output signal of noise level detection circuit 22 (noise level detection signal NS). However, when "H" level expansion motion picture portion edge signal MEH,V is output from vertical expansion circuit 42, the output signals of AND gates 24 and 26 are forced to be set at (0, 0) irrespective of the state of NS of noise level detection signal NS. Output signals (0, 0) of AND gates 24 and 26 are sent to the input terminals of the most significant two bits of ROM 18. Consequently, at ROM 18, input/output characteristics set 4 is selected, and the output value (corrected difference KE) becomes null irrespective to the value of input (difference K). As a result, adder 12 does not add corrected difference KE to input video signal VSi. That is, no noise reduction processing is carried out, and the input video signal is sent directly as output video signal VSo to output terminal 20 and frame memory 16.

As explained above in the embodiment of FIG. 1, at the noise reduction processing inhibitor, the edge of the motion picture portion in the image is detected by means of edge detection circuit 30, comparator 32, threshold detection circuit 34, frame memory 36, and exclusive OR gate 38; with respect to the vicinity of the edge portion of the motion picture, input/output characteristics set (4) of ROM 18 is selected by means of horizontal expansion circuit 40, vertical expansion circuit 42, and AND circuits 24 and 26, and thus no noise reduction processing is carried out in this case. In this configuration, when the variation over time of the image is relatively small at the edge of the motion picture, no noise reduction processing is performed for input video signal VSi corresponding to the edge, and the input video signal is directly output as output video signal VSo. Consequently, only the default image appears at the vicinity of the edge of the motion picture on the reproduced image, there is no overlap with the preceding picture, and hence there is no blurring over time, and the trailing shown in FIG. 10 can be avoided.

Figure 7:
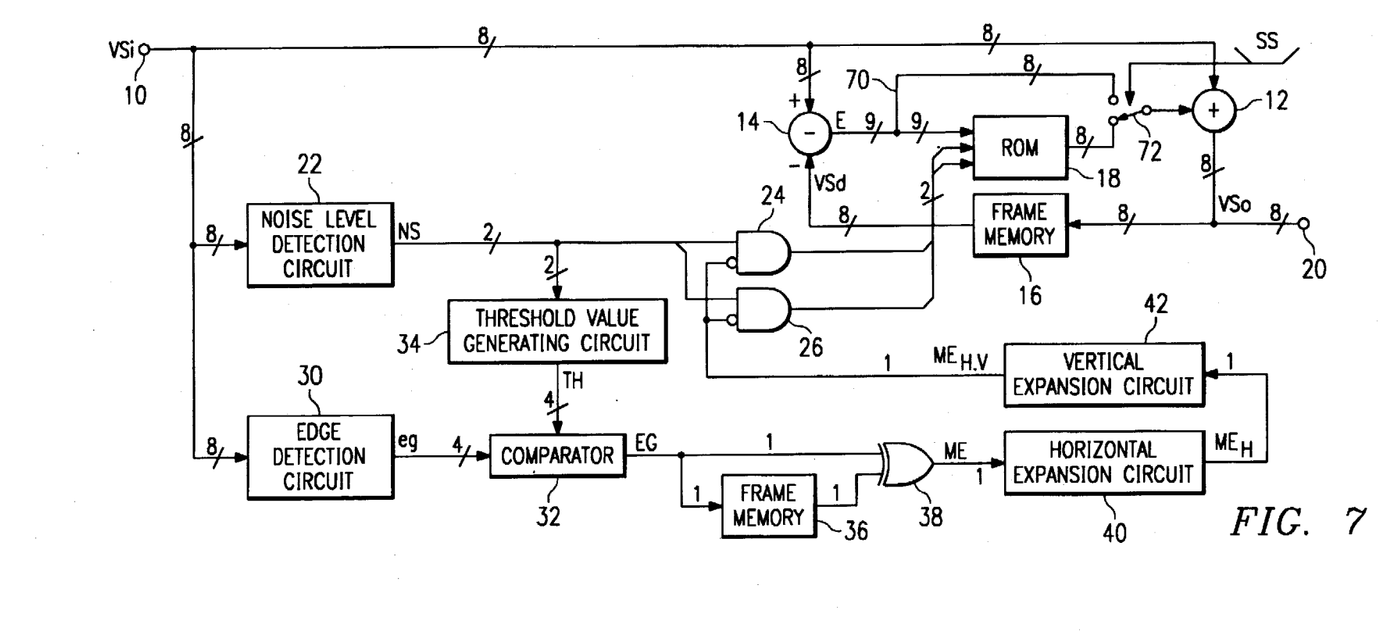
FIG. 7 is a block diagram illustrating the configuration of the noise reduction circuit in another embodiment for use in MUSE decoder in this invention.
Figure 8:
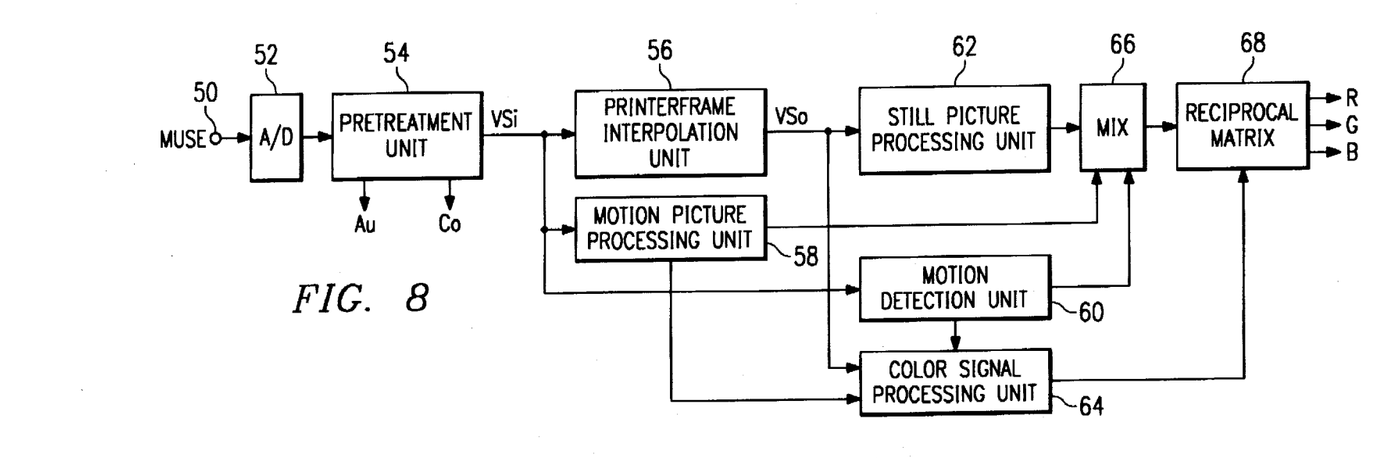
FIG. 8 is a block diagram illustrating the configuration of the MUSE decoder.

FIG. 7 shows another embodiment comprising a modified configuration from the configuration of the aforementioned embodiment of FIG. 1 for using the noise reduction circuit for MUSE decoder. FIG. 8 is a schematic diagram illustrating the configuration of the MUSE decoder.

In FIG. 8, analog MUSE signal, which has been FM rectified by a BS tuner (not shown in the figure), is input to input terminal 50. For the input MUSE signal, after conversion to a digital signal with a frequency of 16.2 MHz by means of an analog/digital converter 52, the signal is input to pretreatment unit 54. At this pretreatment unit 54, for the digital MUSE signal, waveform equalization and other processing is carried out, while audio signal AU and control signal CO are extracted and video signal VSi is output. This video signal VSi is input to interframe interpolation unit 56, motion picture processing unit 58, and motion [picture] detection unit 60.

At interframe interpolation unit 56, one frame of video signal is interpolated with respect to the video signal of the default frame. At the same time, the noise reduction processing is carried out for the still picture, and video signal VSo with a frequency of 32.4 MHz is output. The noise reduction circuit shown in FIG. 7 is used for the noise reduction processing at this interframe interpolation unit 56.

Video signal VSo [with a frequency] of 32.4 MHz output from interframe interpolation unit 56 is input to still picture processing unit 62, and also to color signal processing unit 64). At still picture processing unit 60, the brightness still video signal has its frequency changed from 32.4 MHz to 48.6 MHz, while interframe interpolation is performed. From still picture processing unit 62, brightness still picture signal at 48.6 MHz is output and is sent to mixer circuit 66.

Motion picture processing unit 58 has an intrafield interpolation unit and a sampling frequency conversion unit, etc. As the motion picture portion has motion in the time direction, in order to prevent deviation in the motion picture, interpolation is carried out within one field, and the motion picture signal at 32.4 MHz is obtained after the interpolation. In order to fit with the still picture, the brightness motion picture signal also has its frequency converted from 32.4 MHz to 48.6 MHz. The motion picture signal at 48.6 MHz output from motion picture processing unit 58 enters mixer circuit 66. Mixer circuit 66 mixes the still picture signal and the motion picture signal corresponding to the motion detection signal from motion detection unit 60). The motion picture signal at 32.4 MHz after intrafield interpolation obtained from motion picture processing unit 58 is sent to color signal processing unit 64). At color signal processing unit 64), almost the same processing as that for the brightness signal is carried out. Reciprocal matrix circuit 68 synthesizes the brightness signal from mixer circuit 66 and the color signal from color signal processing unit 64, followed by reciprocal matrix conversion to form RGB signal for output.

The circuit shown in FIG. 7 is almost identical to that shown in FIG. 1. There are only two different features. One is that frame memory (16) has a configuration as 2-frame memory to provide a delay of two frames for matching with the specifications of MUSE, which has each picture made of 2 or 4 frames. The other difference is that there is a through signal transmission line 70 and a switching circuit 72 for alternately switching corrected difference KE from ROM 18 and through delayed video signal VSd from through transmission line 70 by means of a sampling signal SS at 16.2 MHz.

Output video signal VSo has a frequency at 32.4 MHz, and delayed video signal VSd with a delay of 1 or 2 frames is output from frame memory 16 at 32.4 MHz. From subtractor 14, at a frequency of 16.2 MHz, difference E between input video signal VSi and delayed video signal VSd is derived, while delayed video signal VSd, at a period [sic; frequency] of 16.2 MHz and phase shifted by 180°, passes directly and is sent as through delayed video signal VSd to switching circuit 72 via through transmission line 70. On through transmission line 70, the most significant bit among the 9 bits output from subtractor 14 is not transmitted.

At switching circuit 72, in step with difference E from subtractor 14, switching is performed at a frequency of 16.2 MHz to the side of ROM 18, and corrected difference KE from ROM 18 is sent to adder 12. On the other hand, with a phase shift of 180°, and in step with through delayed video signal VSd, switching is performed at a frequency of 16.2 MHz to the side of through transmission line 70, and through delayed video signal VSd is output as output video signal VSo through adder 12. In this switching configuration, for input video signal VSi, the noise reduction processing and the interframe interpolation processing are carried out at the same time by means of a time sharing scheme. In the noise reduction circuit shown in FIG. 7, also, there is a noise reduction processing inhibitor unit just as that in FIG. 1. It is used to mask the noise reduction processing for the edge of the motion picture portion on the image. Consequently, it is possible to avoid the blurring over time and trailing in the vicinity of the edge of the motion picture portion on the reproduced image.

Here, frame memory (36) in the edge detection circuit provides a delay of 2 frames. This is because, in the case of MUSE, the noise reduction processing is carried out between pixels separated from each other by two frames.

In the aforementioned embodiment, horizontal expansion circuit 40 and vertical expansion circuit 42 are arranged, and the noise reduction processing inhibiting region is not limited to the edge of the motion picture, but also is expanded to include the vicinity of the edge. However, if needed, these circuits may be omitted. Also, motion picture portion edge signal ME (MEH and MEH,V) can be directly sent to ROM 18 and corrected difference KE is set to null in the control. otherwise, a switching circuit may be arranged on the side of output of ROM 18, and the switching circuit is controlled for ON/OFF by means of the motion picture portion edge signal. Also, various other methods/means may be used as the methods/means for detecting the edge of the motion picture portion in addition to the methods/means presented as embodiments in the above. Also, the noise reduction circuit of this invention is not limited to TV receivers, it may also be adopted for any other image processing equipment.

In the noise reduction circuit in accordance with this invention, based on the input video signal, the edge of the motion picture portion can be detected, and the noise reduction processing is inhibited for the edge of the motion picture portion, while the input video signal is directly output as the output video signal. Consequently, even in the case of a relatively small variation over time for the edge of the motion picture portion on the image, there is still no blurring and trailing, or other image quality degradation problems.

I claim:

1. A noise reduction circuit for reducing the noise contained in a video signal, said noise reduction circuit comprising:

delay means for providing a delayed video signal output delayed by at least one picture unit;

difference generating means for receiving a video signal input and the delayed video signal output from said delay means and providing a difference video signal between the video signal input and the delayed video signal output;

noise reduction processing means connected to said difference generating means and having an input and an output for receiving the difference video signal from said difference generating means, said noise reduction processing means performing noise reduction processing on the difference video signal as provided by said difference generating means;

noise level detection means for receiving the video signal input and having an output connected to said noise reduction processing means for regulating said noise reduction processing means in response to the detection of one of a plurality of noise levels by said noise level detection means;

noise reduction processing inhibiting means including motion picture edge detection means, said motion picture edge detection means having an input for receiving the video signal input and detecting an edge of a motion picture portion in each image based upon the video signal input;

said noise reduction processing inhibiting means being responsive to the detection of the edge of the motion picture portion by said motion picture edge detection means for inhibiting said noise reduction processing means to prevent noise reduction processing for the detected edge of the motion picture such that the video signal input is output directly from the output of said noise reduction processing means as the video signal output;

said noise reduction processing means including a coefficient multiplier and an adder;

said adder having first and second inputs and an output, said adder receiving the video signal input at the first input thereof;

said coefficient multiplier being connected between the output of said difference generating means and the second input of said adder;

the output of said noise level detection means being connected to an input of said coefficient multiplier and selectively determining the coefficient value for multiplying the difference video signal in dependence upon the detection of one of the plurality of noise levels by said noise level detection means;

a signal transmission line connected at a node located between said difference generating means and said coefficient multiplier and extending to said adder;

a switching circuit interposed in said signal transmission line and operable between first and second switch positions for alternately switching the difference video signal as multiplied by said coefficient multiplier through said adder in the first switch position and via said signal transmission line bypassing said coefficient multiplier through said adder in the second switch position in response to a sampling signal applied to said switching circuit for alternately connecting said coefficient multiplier or said signal transmission line to said adder; and the output of said adder being the output of said noise reduction processing means and providing the video signal output of the noise reduction circuit.

2. A noise reduction circuit for reducing the noise contained in a video signal, said noise reduction circuit comprising:

delay means for providing a delayed video signal output delayed by at least one picture unit;

difference generating means for receiving a video signal input and the delayed video signal output from said delay means and providing a difference video signal between the video signal input and the delayed video signal output;

noise reduction processing means connected to said difference generating means and having an input and an output for receiving the difference video signal from said difference generating means, said noise reduction processing means performing noise reduction processing on the difference video signal as provided by said difference generating means;

noise level detection means for receiving the video signal input and having an output connected to said noise reduction processing means for regulating said noise reduction processing means in response to the detection of one of a plurality of noise levels by said noise level detection means;

noise reduction processing inhibiting means including motion picture edge detection means, said motion picture edge detection means having an input for receiving the video signal input and detecting an edge of a motion picture portion in each image based upon the video signal input;

said noise reduction processing inhibiting means being responsive to the detection of the edge of the motion picture portion by said motion picture edge detection means for inhibiting said noise reduction processing means to prevent noise reduction processing for the detected edge of the motion picture such that the video signal input is output directly from the output of said noise reduction processing means as the video signal output;

said noise reduction processing inhibiting means including a threshold generating circuit connected to the output of said noise level detection means;

a comparator connected to the outputs of said motion picture edge detection means and said threshold generating circuit and producing an output signal in response to the comparison;

said comparator providing a first output signal if the edge detection signal output from said motion picture edge detection means is smaller than the threshold signal output from said threshold generating circuit and producing a second output signal different from said first output signal when said edge detection signal output from said motion picture edge detection means is larger than the threshold signal output from said threshold generating circuit; and the output of said comparator being connected to said noise reduction processing means and operable to inhibit said noise reduction processing means when said second output signal is produced by said comparator.

3. A noise reduction circuit as set forth in claim 2, wherein said noise reduction processing means includes a coefficient multiplier and an adder;

the output of said comparator being connected to an input of said coefficient multiplier of said noise reduction processing means;

said adder having first and second inputs and an output, said adder receiving the video signal input at the first input thereof;

said coefficient multiplier being connected between the output of said difference generating means and the second input of said adder;

the output of said noise level detection means being connected to a further input of said coefficient multiplier and selectively determining the coefficient value for multiplying the difference video signal in dependence upon the detection of one of the plurality of noise levels by said noise level detection means; and the output of said adder being the output of said noise reduction processing means and providing the video signal output of the noise reduction circuit.

4. A noise reduction circuit as set forth in claim 3, wherein said delay means comprises a frame memory for providing the delayed video signal output delayed by at least one picture unit; and said difference generating means comprises a subtractor having a first input connected to the output of said frame memory for receiving the delayed video signal output therefrom and having a second input for receiving the video signal input and providing the difference video signal between the video signal input and the delayed video signal output for input to said coefficient multiplier of said noise reduction processing means.

5. A noise reduction circuit as set forth in claim 4, further including a second frame memory having an input connected to the output of said comparator of said noise reduction processing inhibiting means; and an exclusive OR logic gate located between said comparator and said coefficient multiplier of said noise reduction processing means, said exclusive OR logic gate having a first input connected to the output of said comparator and the second input connected to the output of said second frame memory for receiving the output signal of said comparator delayed by one frame; said exclusive OR gate producing a high level logic output signal in dependence upon either the output signal of said comparator or the output signal of said second frame memory being a real edge detection signal for input to said coefficient multiplier of said noise reduction processing means.

6. A noise reduction circuit as set forth in claim 3, further including logic gate means having first and second inputs and an output;

said logic gate means being interposed between said noise level detection means and said noise reduction processing means and also between said comparator and said noise reduction processing means;

the output of said noise level detection means being connected to an input of said coefficient multiplier of said noise reduction processing means via said logic gate means; and the output of said comparator being connected to an input of said coefficient multiplier of said noise reduction processing means via said logic gate means.

7. A noise reduction circuit as set forth in claim 6, wherein said logic gate means comprises first and second AND gates each having first and second inputs and an output;

said first and second AND gates producing output signals corresponding to the output signal of said noise level detection means for input to said coefficient multiplier of said noise reduction processing means in response to the first output signal being produced by said comparator; and said first and second AND gates producing "0", "0" output signals regardless of the state of the output signal of said noise level detection means for input to said coefficient multiplier of said noise reduction processing means in response to the second output signal being produced by said comparator for inhibiting said noise reduction processing means.

8. A noise reduction circuit for reducing the noise contained in a video signal, said noise reduction circuit comprising:

delay means for providing a delayed video signal output delayed by at least one picture unit;

difference generating means for receiving a video signal input and the delayed video signal output from said delay means and providing a difference video signal between the video signal input and the delayed video signal output;

noise reduction processing means connected to said difference generating means and having an input and an output for receiving the difference video signal from said difference generating means, said noise reduction processing means performing noise reduction processing on the difference video signal as provided by said difference generating means, said noise reduction processing means including a coefficient multiplier having a plurality of characteristics sets of coefficient values, and an adder having first and second inputs and an output, said adder receiving the video signal input at the first input thereof, and said coefficient multiplier being connected between the output of said difference generating means and the second input of said adder;

noise level detection means for receiving the video signal input and having an output connected to said noise reduction processing means for regulating said noise reduction processing means in response to the detection of one of a plurality of noise levels by said noise level detection means;

said noise level detection means being responsive to the noise in the video signal input to provide a noise level detection signal at one value of a plurality of possible values for the noise level detection signal indicative of a detected specific noise level from a plurality of possible noise levels;

each of the plurality of possible values for the noise level detection signal corresponding to respective one of the plurality of characteristics sets of coefficient values of said coefficient multiplier;

the output of said noise level detection means being connected to an input of said coefficient multiplier;

one characteristics set of coefficient values of said plurality of characteristics sets of coefficient values of said coefficient multiplier being selected in response to the noise level detection signal at a particular value of the plurality of possible values being input from the noise level detection means from which the coefficient value is determined for multiplying the difference video signal and dependent upon the detection of one of noise level from the plurality of possible noise levels by said noise level detection means; noise reduction processing inhibiting means connected to an input of said coefficient multiplier and including motion picture edge detection means, said motion picture edge detection means having an input for receiving the video signal input and detecting an edge of a motion picture portion in each image by generating a difference between adjacent pixels of said image in both a horizontal and a vertical direction and comparing said difference with a threshold signal related to said noise level detection signal;

said noise reduction processing inhibiting means being responsive to the detection of the edge of the motion picture portion by said motion picture edge detection means for inhibiting the operation of said coefficient multiplier of said noise reduction processing means to prevent noise reduction processing for the detected edge of the motion picture such that the video signal input is output directly from the output of said adder of said noise reduction processing means as the video signal output.

9. A noise reduction circuit as set forth in claim 8, wherein the delayed video signal output provided by said delay means is delayed by one picture unit.

* * * * *